United States Patent
Bogatyrev et al.

(10) Patent No.: US 6,512,475 B1
(45) Date of Patent: Jan. 28, 2003

(54) HIGH-FREQUENCY DUAL-CHANNEL GROUND-PENETRATING IMPULSE ANTENNA AND METHOD OF USING SAME FOR IDENTIFYING PLASTIC PIPES AND REBAR IN CONCRETE

(75) Inventors: Evgueni F. Bogatyrev, Derry, NH (US); Roger L. Roberts, Amesbury, MA (US)

(73) Assignee: Geophysical Survey Systems, Inc., North Salem, NH (US)

( * ) Notice: Subject to any disclaimer, the term of this patent is extended or adjusted under 35 U.S.C. 154(b) by 0 days.

(21) Appl. No.: 09/542,085

(22) Filed: Apr. 3, 2000

Related U.S. Application Data

(60) Provisional application No. 60/127,496, filed on Apr. 2, 1999.

(51) Int. Cl.[7] .......................... G01S 13/88; G01S 13/00
(52) U.S. Cl. ......................... 342/22; 342/27; 343/719; 343/793; 343/841
(58) Field of Search ............................. 342/21, 22, 25, 342/27, 28, 59, 118, 127, 134, 135, 136, 175, 176, 179, 188–197; 343/719, 793–824, 841, 844, 850, 851, 860, 893, 904

(56) References Cited

U.S. PATENT DOCUMENTS

| | | | |
|---|---|---|---|
| 2,869,122 A | * | 1/1959 | Babcock ................ 343/817 X |
| 3,665,466 A | | 5/1972 | Hibbard ........................ 342/59 |
| 3,739,392 A | * | 6/1973 | Ross et al. .............. 343/807 X |
| 4,062,010 A | * | 12/1977 | Young et al. .................. 342/21 |
| 4,198,641 A | * | 4/1980 | Gibson ........................ 343/797 |
| 4,698,634 A | | 10/1987 | Alongi et al. ................. 342/22 |
| 5,130,711 A | * | 7/1992 | Kimura et al. ................ 342/22 |
| 5,384,715 A | | 1/1995 | Lytton |
| 5,420,589 A | | 5/1995 | Wells et al. .................. 342/22 |
| 5,748,003 A | | 5/1998 | Zoughi et al. |
| 5,835,054 A | | 11/1998 | Warhus et al. ................ 342/22 |
| 5,939,889 A | | 8/1999 | Zoughi et al. |
| 5,952,561 A | | 9/1999 | Jaselskis et al. |
| 6,025,812 A | * | 2/2000 | Gabriel et al. .............. 343/797 |

OTHER PUBLICATIONS

R. Zoughi, G. L. Cone, and P.S. Nowak, "Microwave Nondestructive Detection of Rebars in Concrete Slabs," NDT Solution, 1991, The American Society for Nondestructive Training, Inc.

* cited by examiner

*Primary Examiner*—Bernarr E. Gregory
(74) *Attorney, Agent, or Firm*—Wolf, Greenfield & Sacks, P.C.

(57) ABSTRACT

An antenna system for ground-penetrating radar use, comprising first and second co-located antenna element pairs orthogonally oriented with respect to each other. Each of the element pairs includes a transmit element and a receive element. A metallic enclosure (such as a box) shields the element pairs and is open on one side to face a structure to be probed by signals from the transmit elements. The transmit and receive elements are dimensioned, shaped and arranged (a) to achieve low mutual impedance between the elements, (b) to have high sensitivity to reflected signals received from the structure being probed; and (c) to accommodate a desired rise time of a transmit pulse. The transmit elements and receive elements preferably are electrical dipoles but they may also be magnetic dipoles such as slot antennas. When electrical dipoles are employed, they may be formed of elongated diamond-shaped conductive surfaces or be of other appropriate geometries. The transmit and receive elements are positioned within the box and the box dimensioned such that (a) reflections from a top of the box reinforce transmitted signals and (b) the impedance at the feedpoints of the transmit and receive elements is relatively stable as the antenna system is moved over the structure being probed.

21 Claims, 7 Drawing Sheets

HIGH-FREQUENCY DUAL-CHANNEL GROUND-PENETRATING IMPULSE ANTENNA AND METHOD OF USING SAME FOR IDENTIFYING PLASTIC PIPES AND REBAR IN CONCRETE

This application claims the benefit of Provisional application No. 60/127,496, filed Apr. 2, 1999.

CROSS-REFERENCE TO RELATED APPLICATIONS

This Application is related to the following U.S. patent applications, the full disclosures of which are hereby incorporated by reference: Roger L. Roberts, "Determining the Condition of a Concrete Structure Using Electromagnetic Signals," Ser. No. 09/457,749, filed Dec. 8, 1999, now U.S. Pat. No. 6,429,802; and Roger L. Roberts, "Determining the Depth of Reinforcing Bars in a Concrete Structure using Electromagnetic Signals," Ser. No. 09/457,512, filed Dec. 8, 1999.

FIELD OF THE INVENTION

This invention relates to the field of antennas for ground-penetrating radar, and to their use. In particular, it relates to a high-frequency antenna system useful for, among other applications, identifying plastic pipes and rebar in concrete, and to a process using said antenna system to identify plastic pipes and rebar in concrete.

BACKGROUND OF THE INVENTION

Many applications and needs exist today for ground-penetrating radar systems. Among these, in particular, are a need to probe man-made structures such as bridge decks, to assess their condition or to locate internal features. Needs also exist to probe natural structures and natural structures that have been altered by mankind as, for example, by the burying of metal or plastic pipes or other objects.

Ground penetrating radar (GPR) is a technique that may be used to image the inside of a structure by collecting the echoes (or reflections) resulting from electromagnetic signals such as, for example, electromagnetic waves of typically high frequency, radiated into the structure.

One such structure is a bridge deck. A bridge deck is the portion of a bridge upon which vehicles travel. Bridge decks are typically made of reinforced concrete. As referred to herein, concrete is a mixture of fine and coarse aggregates such as, for example, crushed stone or gravel, firmly bound into a monolithic mass by a cementing agent such as, for example, Portland cement. Reinforced concrete as referred to herein is concrete in which metal rods or bars, preferably made of steel, are incorporated into the concrete in such a manner as to reinforce or strengthen the more or less brittle nature of concrete and the resulting structure. Such rods or bars carry the tension to which a concrete structure may be subjected, thus reinforcing the concrete, and are referred to herein as reinforcing bars or rebars. As used herein, a substantially concrete structure is a structure where the primary constituent is concrete. Such a substantially concrete structure may contain reinforcing bars to improve tensile strength, a waterproofing membrane to protect the structure from moisture, an asphalt layer or overlay, other added elements to improve durability or performance, or possibly inadvertently added elements.

The depth of the rebars relative to the concrete surface, commonly called "concrete cover," is important for at least two reasons. First, the depth of the rebar affects the overall tensile strength of the bridge deck, and second, rebar corrosion potential is related to the depth of the rebar in the concrete. Rebar corrosion may compromise the structural integrity of a reinforced concrete bridge deck, and lead to further deterioration of the concrete that further compromises structural integrity. Additionally, a bridge deck may be subjected to extreme climates such as, for example, snow, ice, and thermal freeze-thaw cycles. Further, such extreme climates, and human intervention to permit the flow of traffic on the bridge amidst these harsh conditions, may result in the ingress of road salt. These factors may lead to the eventual deterioration of portions of the bridge deck, making travel on the bridge unsafe.

Consequently, at least one government, the State of New Hampshire, USA, has implemented a quality control (QC) policy which rewards bridge contractors who place the rebars at the correct depth in new bridge decks, and penalizes contractors negligent in rebar placement. The QC policy specifies the measurement of rebar cover to within ±3 millimeters.

The policy also requires the measurement of many rebars per bridge deck, to establish a statistical basis for assessing contractor performance. The large number of rebars that need to be located makes prohibitive the use of invasive techniques, such as, for example, core drilling, to obtain the depths of all of the rebars.

Thus, there is an established need to accurately determine the position and depth of rebars used in the construction of reinforced concrete bridge decks.

A need also exists for locating plastic pipes in a variety of structures, including structures containing rebars. It may be necessary to locate a plastic pipe to effect a repair or to avoid the plastic pipe when effecting a repair or performing other work on other parts of the structure. Such pipes may conduct fluids or they may serve as conduits through which wires or other cables (e.g., optical fiber communication cables) are strung. Damaging a pipe and the wires and cables inside could not only cause service disruptions, but also may prove dangerous to construction workers.

Thus a need exists for locating both rebars and plastic pipes in structures such as bridge decks. The ability to do so with the same apparatus, facilitating the determination of relative positions of those objects, would have particular value.

In general, the need exists for locating and identifying targets such as rebar and plastic pipe at shallow depths in the ground or concrete or like material. Good horizontal resolution is needed in order to distinguish rebars in concrete. Such rebars are generally closely spaced and cannot be distinguished individually by large antennas. That is, target dimensions usually cannot be resolved much smaller than antenna size but a need exists for resolving closely spaced rebars.

SUMMARY OF THE INVENTION

Typically, the rebars inside a reinforced concrete structure are strong radar wave reflectors. Locating rebars within a reinforced concrete structure and determining their depths may be accomplished by analyzing the reflections, particularly the amplitudes and arrival times of the reflections, from the rebars in the reinforced concrete structure.

In a first aspect of the invention, a small (<10 cm) ground-penetrating radar (GPR) antenna is provided, which has two element pairs orthogonally oriented. This is a ground-coupled, dual-channel GPR impulse antenna system working at a center frequency of about 1.5 GHz or higher. Each of the element pairs includes a transmit dipole and a receive dipole. The dipoles are disposed in a small metal box which shields them. The dipoles are dimensioned, shaped and arranged (a) to minimize the mutual impedance between the elements, so the transmitted and the received pulses are not affected by the presence of the second (i.e., other) pair of dipoles; and (b) to accommodate a desired rise time of a transmitter pulse (e.g., a few hundred picoseconds) without reflections destructively interfering with the transmitter signal.

Preferably, the dipoles are disposed in the metal box and their placement as well as the box dimensions are such that (a) reflections from a top of the box reinforce the transmitted signal and (b) the impedance at the feedpoints of the antennas do not change much as the antenna system is moved over the terrain or structure being probed.

The antennas must couple well to soil and like media for the "ground" probing uses discussed herein. Preferably, the antennas also may be disposed and arranged and possess the characteristic that direct wave coupling between transmit antennas and receive antennas is kept relatively low.

Electromagnetic waves with electric field components parallel to the long axis of rebar are preferentially scattered relative to electromagnetic waves with a primary electric field polarization perpendicular to the long axis. The opposite is true for the air-filled plastic and polyethylene pipes commonly found in concrete. An antenna (or, more accurately, antenna system) according to the invention, contains two pairs of transmit-receive co-located antennas that are used to collect two channels of data. The radiated electric fields from the two different transmit-receive combinations are orthogonal to each other. Data are collected with the antenna system by moving it over a series of parallel profile lines to detect the linear targets in concrete. The orientation of targets detected over several profile lines is readily obtained and the polarization directions of the two channels of data are known. From this information, the channel of data containing the largest polarization vector component parallel to the target can be determined. The ratio of the target reflection amplitudes from the two channels of data can then be used to obtain the composition of the target.

In related application Ser. No. 09/457,749, filed Dec. 8, 1999 in the name of Roger L. Roberts, now U.S. Pat. No. 6,429,802, there is described a method of determining, for a substantially concrete structure having at least a first side and containing one or more reinforcing bars, a distance of the one or more reinforcing bars from the first side of the substantially concrete structure. One or more computer-readable data signals are received, and each received data signal represents an electromagnetic signal detected from an area of the concrete structure. One or more of the detected electromagnetic signals include electromagnetic energy reflected from the concrete structure as a result of an electromagnetic signal transmitted into the concrete structure. A distance of one or more of the reinforcing bars from the first side of the substantially concrete structure is determined from the one or more computer-readable data signals. In another embodiment, the foregoing application discloses, for a substantially concrete structure having at least a first side and containing one or more reinforcing bars, a system for determining a distance of the one or more reinforcing bars from the first side of the substantially concrete structure. The system includes a computer-readable storage medium to store one or more computer-readable data signals, wherein each data signal represents an electromagnetic signal detected from the concrete structure, and one or more of the detected electromagnetic signals include electromagnetic energy reflected from the concrete structure as a result of an electromagnetic signal transmitted into the concrete structure, and wherein each detected signal corresponds to an area within the concrete structure. The system also includes a data analysis application to receive the computer-readable data signals and determine from the data signals a distance of one or more of the reinforcing bars from the first side of the substantially concrete structure. An antenna system according to the invention is useful in such systems and for practicing such methods.

According to an aspect of the invention, there is provided an antenna system for ground-penetrating radar use, comprising first and second co-located antenna element pairs orthogonally oriented with respect to each other. Each of the element pairs includes a transmit element and a receive element. A metallic enclosure (such as a box) shields the element pairs and is open on one side to face a structure to be probed by signals from the transmit elements. The transmit and receive elements are dimensioned, shaped and arranged (a) to achieve low mutual impedance between the elements, (b) to have high sensitivity to reflected signals received from the structure being probed; and (c) to accommodate a desired rise time of a transmit pulse. The transmit elements and receive elements preferably are electrical dipoles but they may also be magnetic dipoles such as slot antennas. When electrical dipoles are employed, they may be formed of elongated diamond-shaped conductive surfaces or be of other appropriate geometries.

According to another aspect of the invention, the transmit and receive elements are positioned within the box and the box dimensioned such that (a) reflections from a top of the box reinforce transmitted signals and (b) the impedance at the feedpoints of the transmit and receive elements is relatively stable as the antenna system is moved over the structure being probed.

Preferably, such an antenna system also includes material which is lossy at the frequencies at which the antenna system is operated, at least partly filling the space in the enclosure between the transmit and receive elements and an opposite portion of the enclosure.

According to yet another aspect of the invention, there is provided in the enclosure a conductive shield constructed and arranged to shield the transmit elements from the receive elements.

In accordance with a further aspect of the invention, in operation, data are collected with the antenna system over a series of parallel profile lines to detect the linear targets in concrete. The orientation of targets detected over several profile lines is readily obtained and the polarization directions of the two channels of data are known. From this information, the channel of data containing the largest polarization vector component parallel to the target can be determined. The ratio of the target reflection amplitudes from the two channels of data can then be used to obtain the composition of the target. That is, the two amplitudes can be compared to determine which is greater. That information, together with information as to the orientation of the antenna assembly relative to the target, reveals the nature of the material providing the reflection. The resulting information about rebar and plastic pipe location can be displayed on a computer-driven screen.

These and other features and advantages of the invention will be more readily understood and appreciated from the detailed description below, which should be read together with the accompanying drawing figures.

DETAILED DESCRIPTION

Figure 1:
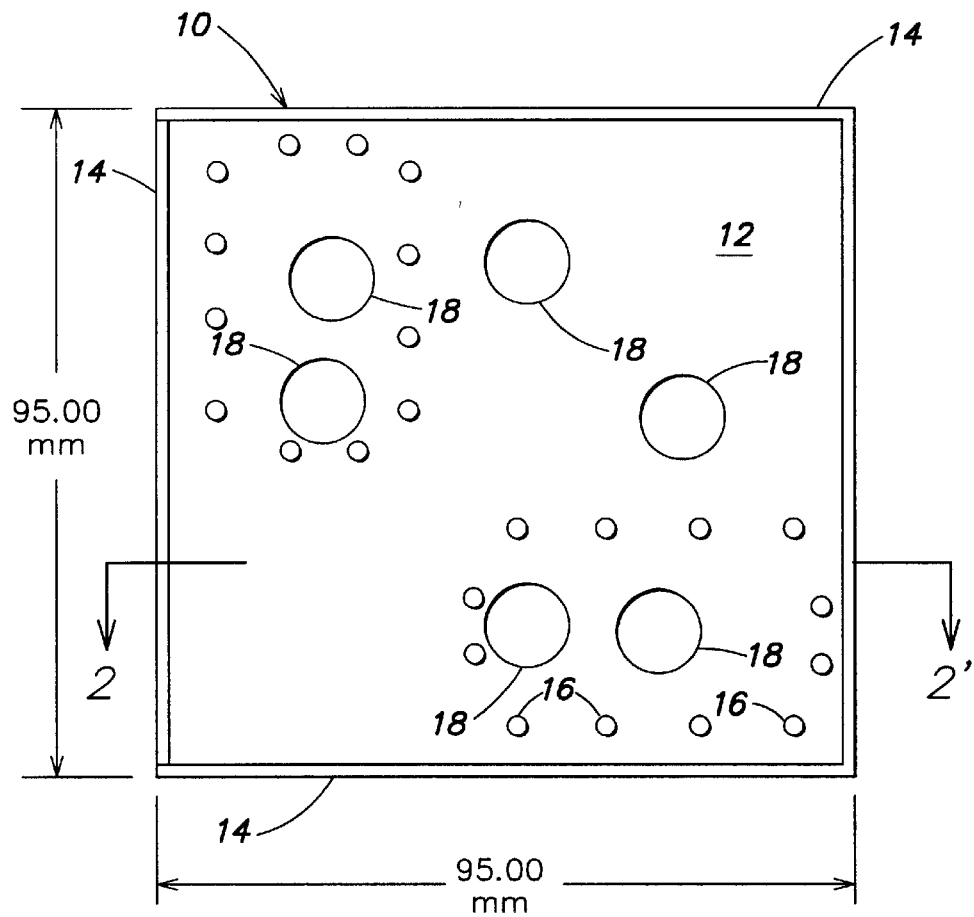
FIG. 1 is a top plan view of a shelf which is installed in a box housing an antenna system according to the invention, the shelf serving as a shield and as a mounting surface for transmit and receive electronics for the antenna system.
Figure 2:
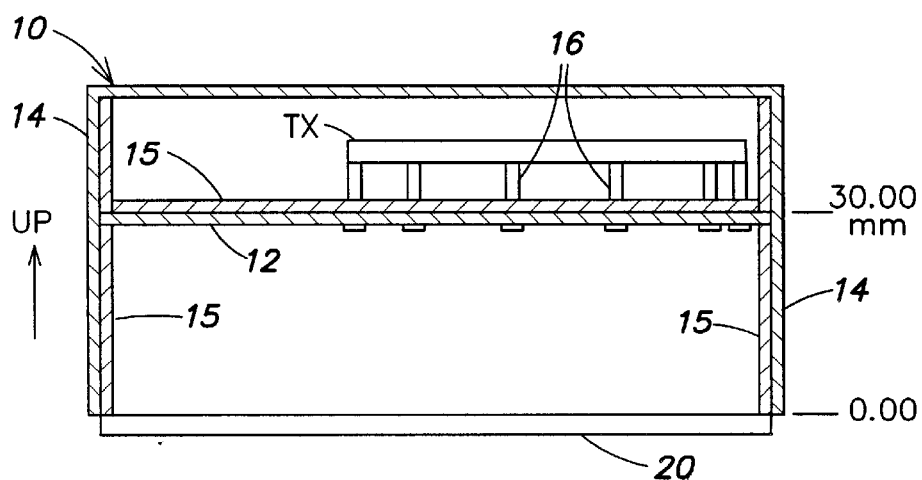
FIG. 2 is a side cross-sectional view of the antenna system of FIG. 1, taken along the line 2–2' thereof.

An exemplary embodiment of an antenna system according to one aspect of the invention is illustrated in the accompanying drawing figures. This embodiment is for an antenna system which operates at a center frequency between about 1.5 and 2.0 GHz. With suitable alteration of dimensions, the embodiment can be adapted to other frequencies, of course. The antenna system has a box-like shape, approximately square from a "top" view. It stands approximately 45 mm high and extends approximately 95 mm on each side, for the example shown. As seen in FIGS. 1 and 2, a shelf 12 is mounted "horizontally" in the box 10, between the four side walls of the box, approximately 15 mm from the top of the side walls. Shelf 12 and sides 14 may be metal sheet or may be made of conventional printed circuit board material, such as 1.60 mm FR4, covered on one side with two-ounce copper cladding, indicated at 15, or otherwise suitably constructed. The copper-clad sides of the side walls are all placed on the interior of the box and the copper-clad side of the shelf is used as the shelf's top side. The seams between the side walls and between the shelf and side walls are all soldered with continuous beads of solder or riveted. A plurality of swage pins 16 (just a few of which are labeled) are soldered to and extend upwardly from the shelf. These swage pins are used to mount the needed transmit electronics (indicated at TX) and receive (RX) electronics (not shown in these figures). The shelf 12 is also provided with several holes 18 through which connections may be made between the electronics and the dipoles.

Figure 3:
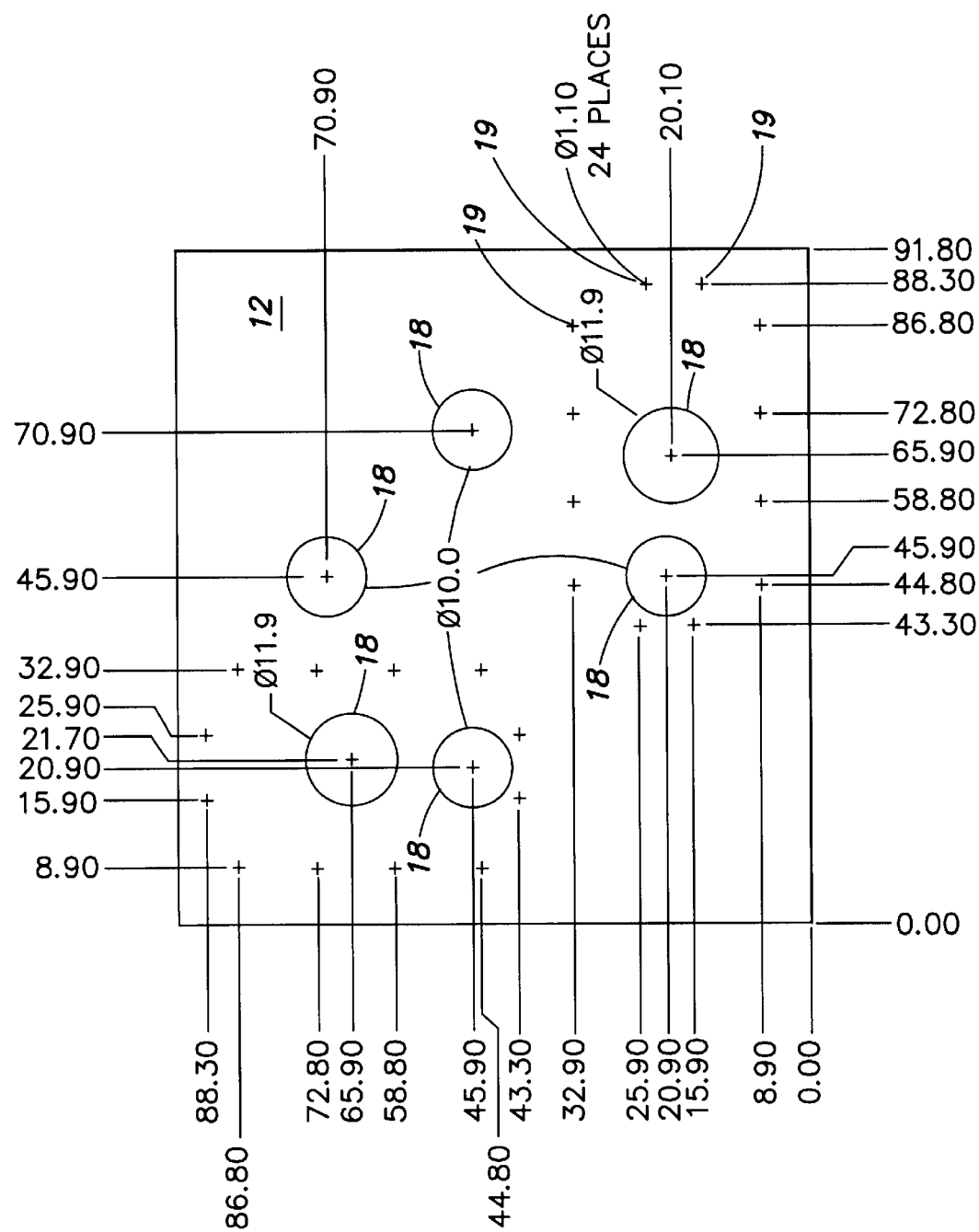
FIG. 3 is a more detailed and dimensioned view of the shelf of FIG. 1.

FIG. 3 gives more dimensional details for the exemplary shelf 12 of the embodiment shown in FIGS. 1 and 2. All dimensions are in millimeters. The holes 19 through which the swage pins are inserted before soldering are illustrated as being 1.10 mm in diameter. The larger holes 18 are illustrated as being 10.0 and 11.9 mm in diameter. None of these dimensions is critical.

Figure 4:
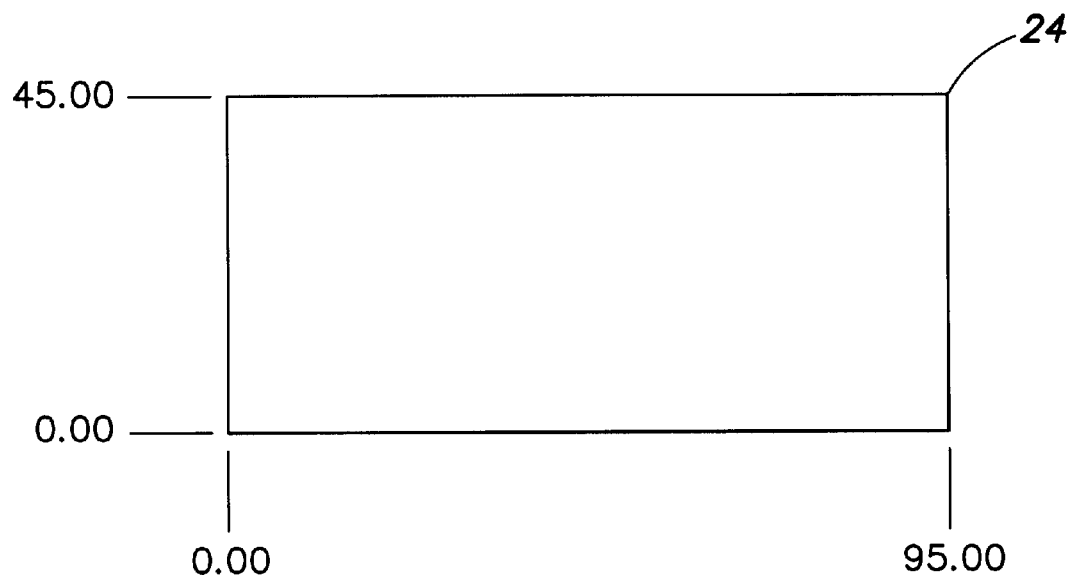
FIGS. 4 and 5 are plan view of side panels for the box shown in FIG. 1.
Figure 5:
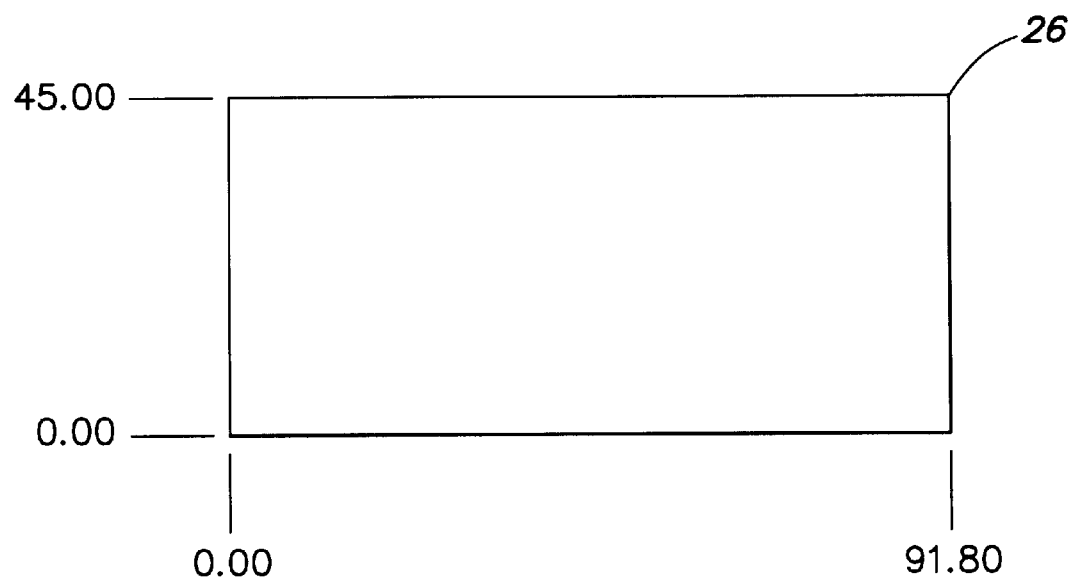

The side panels 14 actually are not all identical. As shown in FIGS. 1, 4 and 5, there are two 95.00 mm long side panels 24 and two 91.80 mm long side panels 26, assembled to form a 95.00 mm×95.00 mm square enclosure.

Figure 6A:
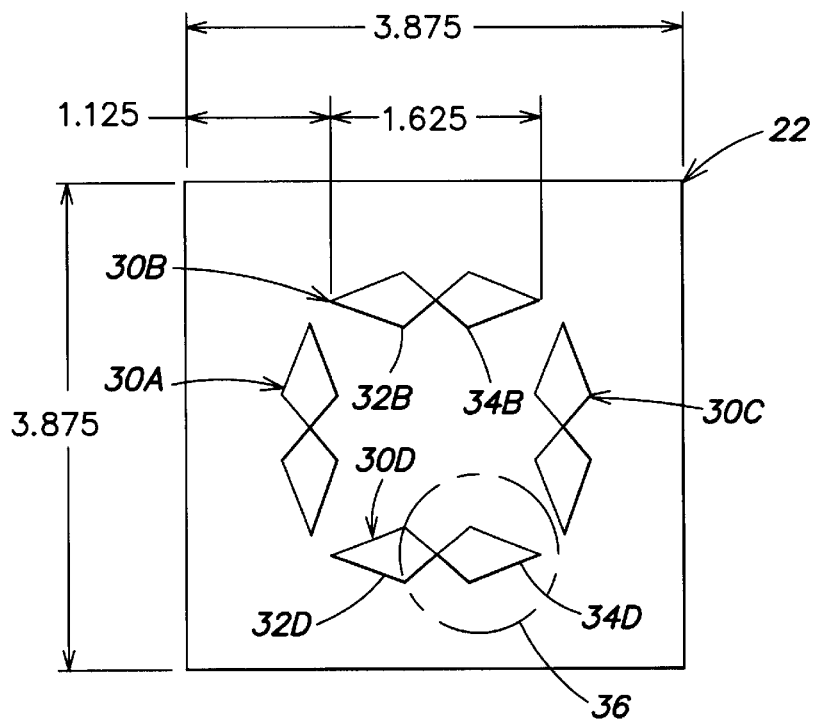
FIGS. 6A–6C are schematic illustrations of patterns of copper usable to form transmit and receive antenna pairs according to an aspect of the invention.
Figure 6B:
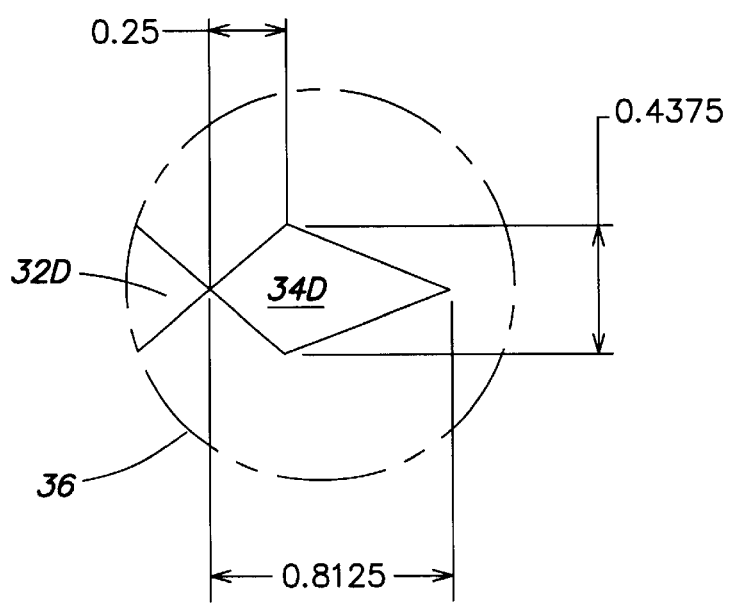
Figure 6C:
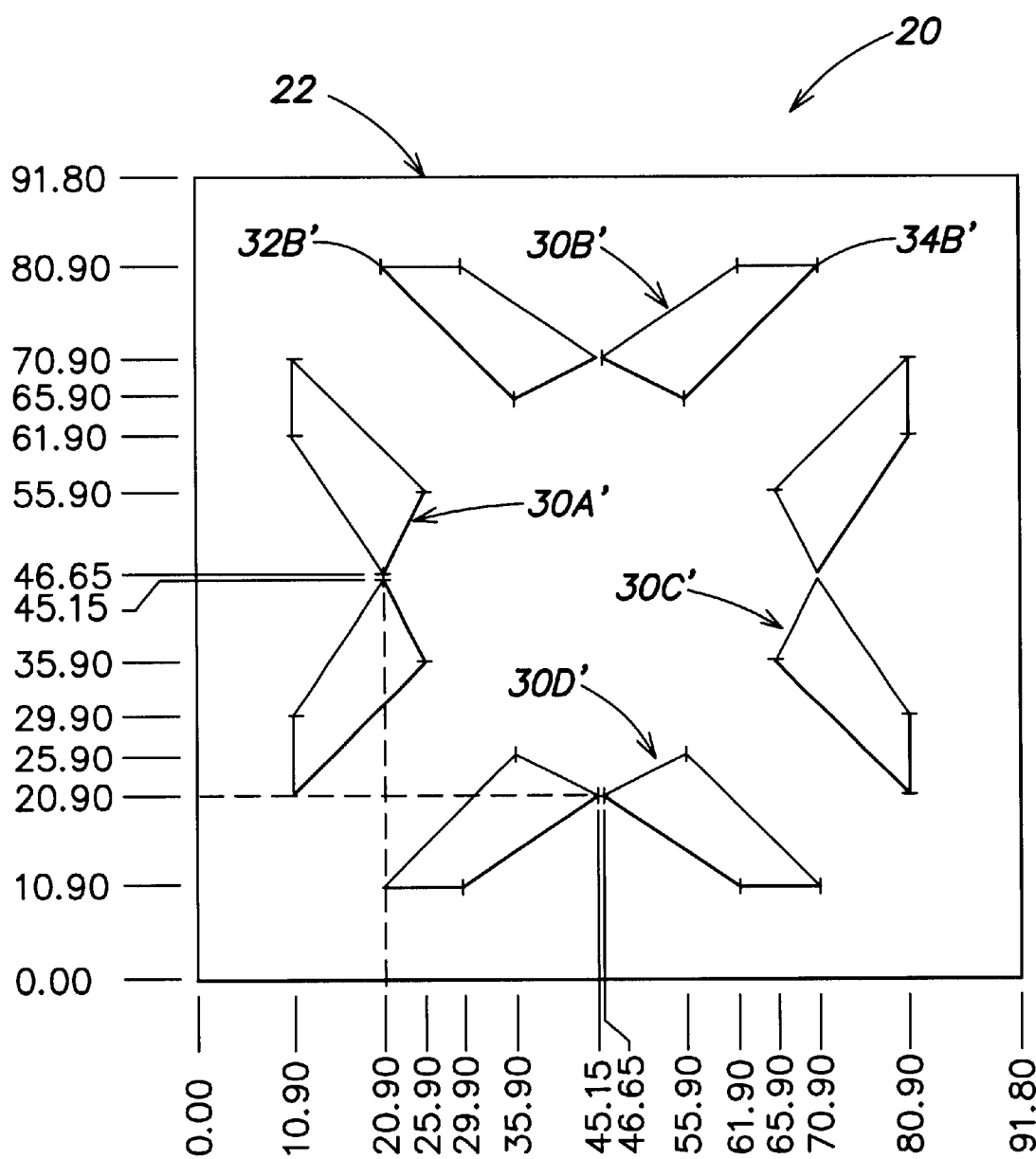

The dipole elements of the antenna system are part of an assembly 20 formed of copper sheet regions on an inactive substrate 22, such as a printed circuit substrate material. Thus the dipoles may be formed by etching a copper-clad printed circuit board to remove the copper which is not desired. With reference to FIGS. 6A–6C, this leaves the four dipoles 30A–30D. Each of dipoles 30A–30D comprises a pair of members (such as the members 32B, 34B of dipole 30B), which are mirror-image polygons. Their feed point(s) is(are) at their closest vertices. A small hole is provided through the substrate (and probably the copper, as well) at the dipole feed points, to allow a conductor to be fed through and soldered to the dipole members.

FIG. 6A shows the layout and dimensions for a first exemplary set of two transmit (e.g., 30A and 30B) and two receive (e.g., 30C and 30D) dipoles which may be used in accordance with and as part of the practice of the present invention. A blowup showing the region 36 in detail and with dimensions is presented in FIG. 6B.

FIG. 6C depicts one alternative layout (i.e., geometry) and dimensions which may be useful for assembling antennas according to the present invention, it thus being understood that the example shown in FIG. 6A is not expected to be the only layout for a useful dipole arrangement. While various geometries may be employed for the antenna elements, it will in general be necessary to determine an appropriate geometry empirically for the particular application involved. However, in accordance with the invention described herein, small antennas are needed. In particular, there are needed four antennas (two for transmitting and two for receiving) which can fit within an area of less than about 10,000 $mm^2$. The antennas must couple well to soil and like media for the "ground" probing uses discussed herein. Preferably, the antennas also may be disposed and arranged and possess the characteristic that direct wave coupling between transmit antennas and receive antennas is kept relatively low. A flat, substantially diamond-shaped (or elongated diamond-shaped, to be more exact) dipole has been found to meet these requirements and to provide a characteristic impedance at the feedpoint of approximately 200 ohms; this impedance matches well to that of soil, into which the antennas transmit or from which they receive. Moreover, the placement of the antennas in the box and relative to the surface of the ground or other structure to be probed is such that variations in the surface will not cause the feedpoint impedance to vary much. The antennas are placed near the bottom of the box. They may be spaced from the surface by skids or a skid plate in the bottom of the box. Of course, the skids or skid plate should be relatively transparent to the transmitted and received signals; polyethylene is an appropriate material, with a thickness of perhaps about 3 mm.

Further, although electrical dipole antennas are shown, magnetic dipoles such as slot antennas also may be useful.

As stated above, it is intended that there be two orthogonally-oriented transmit antennas and two orthogonally-oriented receive antennas. That provides two co-located, differently polarized transmit-receive antenna pairs. The antennas preferably are disposed in a symmetrical arrangement about a central point. This results in the antennas being equidistant from points on a vertical line through that central point, and thus "focused" on data points along that vertical line. Such an arrangement facilitates the development of an image with a fine resolution.

Figure 7:
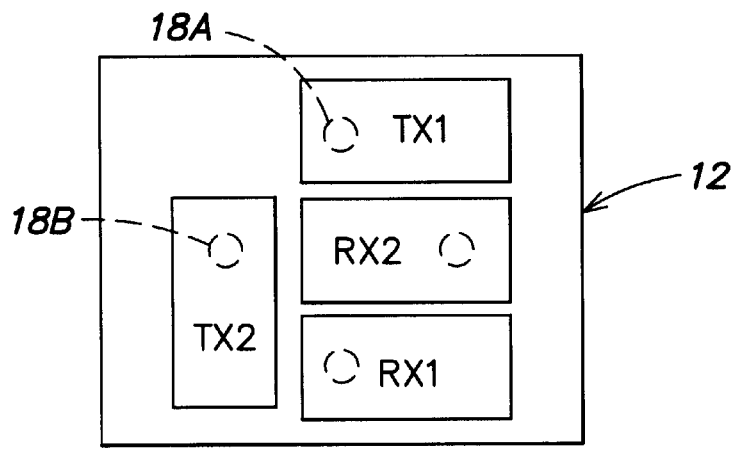
FIG. 7 is a diagrammatic illustration of exemplary placement of transmit and receive electronics on the shelf of FIG. 1.
Figure 8:
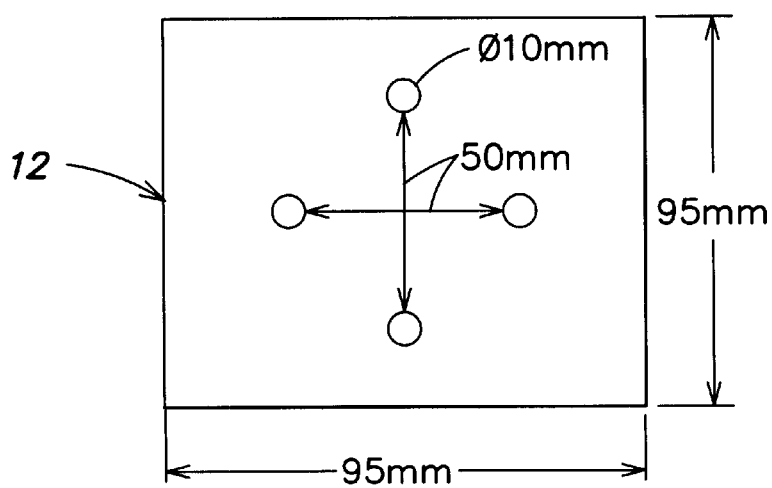
FIG. 8 is a simplified illustration of the shelf of FIGS. I and 7, showing in detail the apertures through which the transmit and receive electronics connect to the antennas.

One potential arrangement is to designate dipoles 30A and 30B the transmitting dipoles (as discussed above) and to designate dipoles 30C and 30D the receiving dipoles. Accordingly, as shown in FIGS. 7–8, a first transmitter module, TX1, may be mounted on the swage pins above hole 18A, a second transmitter module, TX2, may be mounted on the swage pins above hole 18B, etc.

Figure 9:
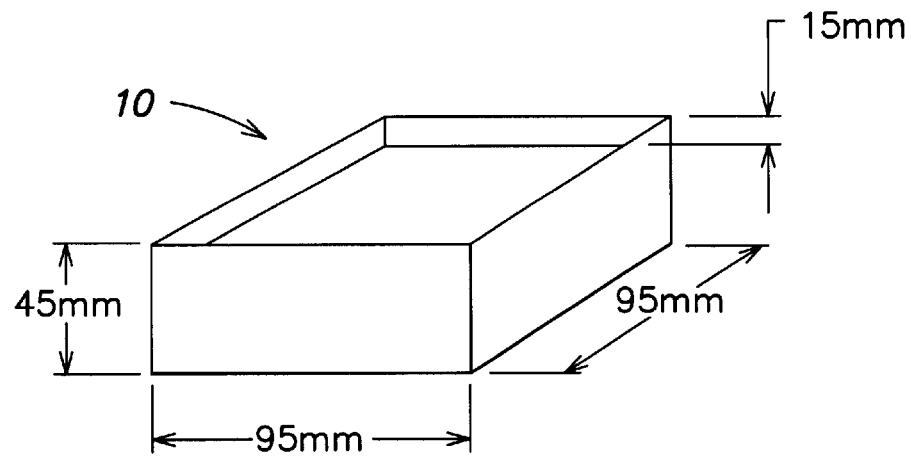
FIG. 9 is an isometric view of the box of FIG. 1 from the outside thereof.
Figure 10:
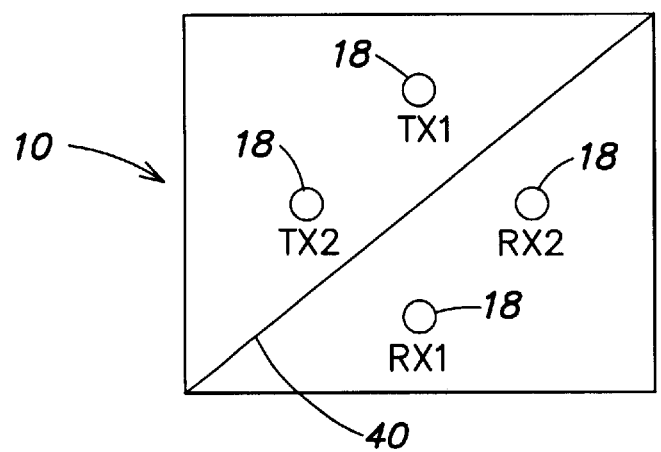
FIG. 10 is a bottom view of the antenna assembly, without the antennas installed.

The antenna assembly 20 is mounted at the bottom aperture formed by the box sides (see FIG. 2). As shown in FIG. 8, the transmit and receive electronics feed the antennas via conductors or waveguides passed through apertures 18. Preferably, the space between the shelf 12 and the antenna assembly 20 is filled with a lossy material such as a foam loaded with carbon. FIGS. 9 and 10 show additional views of box 10. FIG. 9 is an isometric view of the box from the outside thereof, while FIG. 10 is a bottom view of the antenna assembly, without the antennas installed. The labels RX1, RX2, TX1 and TX2 indicate the general areas of the receivers and transmitters and the holes 18 are shown to indicate the antenna feed positions. Optionally, as illustrated in FIG. 10, a shield 40 may be placed between the transmit antennas and the receive antennas. The shield is simply another copper-clad piece of printed circuit board with the copper soldered to the box sides; or it may be a free-standing metal sheet. Various configurations are possible for the shield, dividing the box either diagonally or rectangularly. Additionally, two shields may be employed, instead of just one, the shields dividing the box into four (optionally triangular) compartments, to isolate each of the four transmit and receive antenna elements from the other antenna elements.

The antenna is ideally suited for locating and identifying rebar (or, like rebar, wires or metal pipes) and plastic pipes down to a depth of about 20 cm in moderately cured concrete or other material. Electromagnetic waves with electric field components parallel to the long axis of rebar are preferentially scattered relative to electromagnetic waves with a primary electric field polarization perpendicular to the long axis. The opposite is true for the air-filled plastic and polyethylene pipes commonly found in concrete. Thus the antenna system is useful not only for locating objects and their position and orientation but also, to an extent, for distinguishing their properties. More particularly, it is useful for identifying inhomogeneities in the structure of objects probed.

An antenna (or, more accurately, antenna system) according to the invention, is commercially available as the MODEL 5200 antenna system from the assignee, and contains two pairs of transmit-receive antennas that are used to collect two channels of data. The radiated electric fields from the two different transmit-receive combinations are orthogonal to each other (i.e., differently polarized). Note that this does not necessarily require that the transmit-receive antenna pairings be arranged as illustrated in the exemplary embodiment(s).

Suitable transmit and receive circuitry for driving signals to or amplifying signals from the antenna system, respectively, will be known to those skilled in the art. For example, such circuits may be substantially the same as those used in the MODEL 5100 GPR system available from Geophysical Survey Systems Inc. of North Salem, N.H., assignee hereof. Circuits having similar characteristics may be substituted.

In operation, data are collected with the antenna over a series of parallel profile lines to detect the linear targets in concrete. (The data collection system may be conventional and therefore is not illustrated. It may also be the systems disclosed in the above-identified U.S. Patent Applications.)

The orientation of targets detected over several profile lines is readily obtained and the polarization directions of the two channels of data are known. From this information, the channel of data containing the largest polarization vector component parallel to the target can be determined. The ratio of the target reflection amplitudes from the two channels of data can then be used to obtain the composition of the target. That is, the two amplitudes can be compared to determine which is greater. That information, together with information as to the orientation of the antenna assembly relative to the target, reveals the nature of the material providing the reflection. The resulting information about rebar and plastic pipe location can be displayed on a computer-driven screen. The two different materials may, for example, be color coded. Rebar might be displayed as a first color, such as red, while plastic pipe might be displayed as a second color, such as blue.

Having now described some illustrative embodiments, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the invention. In particular, although many of the examples presented herein involve specific combinations of method steps or apparatus elements, it should be understood that those steps and those elements may be combined in other ways to accomplish the same objectives. Steps, elements and features discussed only in connection with one embodiment are not intended to be excluded from a similar role in other embodiments.

What is claimed is:

1. An antenna system for ground-penetrating radar use, comprising:
   a first antenna element pair;
   a second antenna element pair co-located with and orthogonal to the first antenna element pair;
   each of the element pairs including a transmit element and a receive element;
   a metallic enclosure shielding the element pairs and open on one side to face a structure to be probed by signals from the transmit elements; and
   the elements being dimensioned, shaped and arranged (a) to achieve low mutual impedance between the elements; and (b) to accommodate a desired rise time of a transmitter pulse.

2. The antenna system of claim 1 wherein the transmit elements and receive elements are electrical dipoles.

3. The antenna system of claim 2 wherein the electrical dipoles are formed of elongated diamond-shaped conductive surfaces.

4. The antenna system of claim 2 wherein the dipoles are formed of copper sheet on an inert, planar substrate disposed adjacent an open end of the enclosure.

5. The antenna system of any one of claims 1–4 wherein the enclosure is a box; and the transmit and receive elements are positioned within the box and the box dimensioned such that (a) reflections from a top of the box reinforce transmitted signals and (b) the impedance at the feedpoints of the antennas is relatively stable as the antenna system is moved over the structure being probed.

6. The antenna system of claim 5 further including a shield constructed and arranged to shield the transmit elements from the receive elements.

7. The antenna system of claim 6 wherein the shield is a conductive surface disposed between the transmit and receive elements.

8. The antenna system of any one of claims 1–4 further including material which is lossy at the frequencies at which the antenna system is operated, at least partly filling the space in the enclosure between the transmit and receive elements and an opposite portion of the enclosure.

9. The antenna system of claim 1 wherein the transmit elements and receive elements are magnetic dipoles.

10. The antenna system of claim 9 wherein at least one of the transmit elements and receive elements is a slot antenna.

11. The antenna system of any one of claims 1,2,3,4,9, or 10 wherein the center frequency of the antenna system is greater than 1 GHz.

12. The antenna system of claim 11 wherein the center frequency of the antenna system is greater than 1.5 GHz.

13. The antenna system of claim 12 wherein the enclosure is a rectangular box less than 100 mm on a side and less than 50 mm high.

14. A method of identifying first and second target types in a medium to be probed, the first and second target types providing substantially different reflections to pulses of ground-penetrating radar at high center frequencies, comprising the steps of:
   a. providing an antenna system having a first antenna element pair and a second antenna element pair co-located with the first antenna element pair and orthogonally oriented with respect to the first antenna element pair, each of the element pairs including a transmit element and a receive element;
   b. using the antenna system, transmitting radar pulses into the medium and collecting reflection data over a series of parallel profile lines;
   c. comparing the reflected signals from first and second orthogonally oriented receive elements in the element pairs to determine whether a reflection was due to a metallic object or to a plastic object.

15. The method of claim 14 wherein the step of comparing includes the step of determining a ratio of amplitudes of pulses received by the first and second receive elements in response to pulses transmitted by each of corresponding first and second transmit elements.

16. The method of claim 14 or claim 15 wherein said first target type is rebar and said second target type is plastic pipe.

17. An antenna system for ground-penetrating radar use, comprising:

a first antenna element pair;

a second antenna element pair co-located with and orthogonal to the first antenna element pair, each of the first and second antenna element pairs including a transmit element that transmits radar pulses into a medium and a receive element that receives a reflected signal from a target in the medium;

an enclosure that at least partially encloses the first and second antenna element pairs to shield the first and second antenna element pairs from electromagnetic radiation; and means for achieving low mutual impedance between the first and second antenna element pairs and accommodating a desired rise time of the radar pulse transmitted by the transmit element.

18. The antenna system of claim 17, wherein the enclosure includes at least one side that is substantially transparent to the radar pulse transmitted by the transmit element, and wherein other sides of the enclosure are substantially impervious to electromagnetic radiation.

19. The antenna system of claim 18, wherein the other sides of the enclosure are metallic.

20. An antenna system for ground-penetrating radar use, comprising:

first and second co-located antenna element pairs, each pair including a transmit element and a receive element, wherein the first and second antenna element pairs are constructed and arranged to have low mutual impedance between the pairs, and to accommodate a desired rise time of a transmitted pulse;

an enclosure that at least partially encloses the first and second antenna element pairs to shield the antenna element pairs from electromagnetic radiation; and means for enabling the first and second antenna element pairs to transmit orthogonally-polarized radiation.

21. The antenna system of claim 20, wherein the means for enabling the first and second antenna element pairs to transmit orthogonally polarized radiation includes orthogonally orienting the first antenna element pair with respect to the second antenna element pair.

* * * * *